(12) United States Patent
Moretto

(10) Patent No.: US 8,793,900 B2
(45) Date of Patent: Aug. 5, 2014

(54) METHOD AND PLANT FOR DEHUMIDIFYING MATERIAL IN GRANULAR FORM

(75) Inventor: Renato Moretto, Masanzago (IT)

(73) Assignee: Moretto S.p.A., Massanzago, Padua (IT)

( * ) Notice: Subject to any disclaimer, the term of this patent is extended or adjusted under 35 U.S.C. 154(b) by 263 days.

(21) Appl. No.: 13/277,448

(22) Filed: Oct. 20, 2011

(65) Prior Publication Data
US 2012/0266487 A1  Oct. 25, 2012

(30) Foreign Application Priority Data

Oct. 26, 2010 (IT) ............... PD2010A0322

(51) Int. Cl.
*F26B 21/12* (2006.01)
*F26B 21/08* (2006.01)
*F26B 25/22* (2006.01)
*B29B 13/06* (2006.01)

(52) U.S. Cl.
CPC ............... *F26B 25/22* (2013.01); *F26B 21/083* (2013.01); *B29B 13/065* (2013.01)
USPC ................. 34/381; 34/413; 34/565; 34/137; 34/173; 95/17; 95/123; 96/112; 96/130

(58) Field of Classification Search
USPC ........... 34/381, 413, 474, 491, 565, 137, 168, 34/169, 173; 95/14, 17, 23, 123, 117; 96/109, 110, 112, 130
See application file for complete search history.

(56) References Cited

U.S. PATENT DOCUMENTS

| 2,712,361 | A | * | 7/1955 | Lindsay | 34/171 |
|---|---|---|---|---|---|
| 3,111,398 | A | * | 11/1963 | Jones | 34/245 |
| 4,023,940 | A | * | 5/1977 | Shultz | 96/112 |
| 4,974,337 | A | * | 12/1990 | Tavakoli et al. | 34/471 |
| 6,163,976 | A | * | 12/2000 | Tada et al. | 34/72 |
| 7,464,485 | B2 | * | 12/2008 | Kawase | 34/60 |
| 7,472,494 | B2 | * | 1/2009 | Moretto | 34/416 |
| 2006/0117594 | A1 | * | 6/2006 | Moretto | 34/583 |
| 2006/0168843 | A1 | * | 8/2006 | Zlotos | 34/482 |

(Continued)

FOREIGN PATENT DOCUMENTS

| EP | 0814311 | 12/1997 |
|---|---|---|
| EP | 2224196 | 1/2010 |
| EP | 2186613 | 5/2010 |

OTHER PUBLICATIONS

Zlotos, "Wirksam und Wirtschaftlich oeffective and economical" (Kunststoffe, Carl Hanser Verlag, p. 489, col. 2, line 32—col. 3 line 35, figure 3.

*Primary Examiner* — Steve M Gravini
(74) *Attorney, Agent, or Firm* — Shoemaker and Mattare

(57) ABSTRACT

Granular material is dehumidified by: a) arranging a dehumidification plant having at least one hopper for containing the granular material, having a feed mouth and an output mouth, and at least one dry air generator fluidically connected to a dry air distributor inside the hopper; b) loading granular material into the hopper through the feed mouth; c) measuring the degree of initial humidity of the granular material entering the hopper; d) calculating on the basis of the values of initial humidity measured, the dehumidifying capacity of the dry air flow through the hopper needed to achieve predefined residual humidity values in the granular material leaving the hopper, the residence time of the granular material inside the hopper being fixed; e) generating a dry air flow through said hopper having a dehumidifying capacity calculated in the calculating step d).

19 Claims, 3 Drawing Sheets

(56) References Cited

U.S. PATENT DOCUMENTS

| | | | |
|---|---|---|---|
| 2007/0199203 A1* | 8/2007 | Federico | 34/416 |
| 2008/0295354 A1* | 12/2008 | Moretto | 34/476 |
| 2009/0031580 A1* | 2/2009 | Moretto | 34/487 |
| 2010/0119670 A1* | 5/2010 | Mazzariello | 426/320 |
| 2010/0205821 A1* | 8/2010 | Tada et al. | 34/428 |
| 2010/0217445 A1* | 8/2010 | Moretto | 700/282 |

* cited by examiner

METHOD AND PLANT FOR DEHUMIDIFYING MATERIAL IN GRANULAR FORM

FIELD OF THE INVENTION

The present invention relates to a method and plant for dehumidifying material in granular form, in particular granular material composed of one or more plastic materials.

BACKGROUND OF THE INVENTION

In the processing of plastic materials, the dehumidification treatment of plastic material granules performed before fusion, is of particular importance.

As is known, on account of their hygroscopicity plastic materials in granular form contain molecules of water. During the fusion step the molecules of water may insinuate themselves into the molecular chains of the polymers and break them. This causes surface defects in the final products, bubbles and lack of structural and color homogeneity to the detriment of the quality of the final product.

The plastic materials in granules to be subjected to dehumidification are typically stored in hoppers connected in a watertight manner to one or more hot and dry air generator devices, in the jargon called "dryers", which blow hot, dry air into the hopper.

Once it has entered the hopper, the dry air (hereinafter called "process air") traverses the mass of plastic material in granules to be dehumidified entirely or in part, removing the humidity contained in them and leaving the hopper through a dedicated exit duct.

As is known, achieving the desired degree of dehumidification for a given granular plastic material which will later be subjected to fusion in a transformer machine, depends on many factors, in particular the residence time of the granular material inside the dehumidification hopper, the specific flow of process air (hereinafter also referred to as "specific airflow") sent to the hopper, the processing temperature and thermo-fluid-dynamic behavior associated with the interaction between the current of process air and the granular plastic material, dependent on the geometry of the hopper.

The residence time $\tau$ is understood to refer to the ratio between the quantity of material inside the hopper and the hourly production imposed by the transformer machine.

Depending on the degree of dehumidification required for a given granular material to be treated, the granules of material must remain inside the hopper for a certain, specific interval of time, at a certain process temperature, such as to permit the diffusion of the molecules of water from the inside of the granules to the outside.

As is known accepted practice requires that the residence time of the granular material to be treated be set a priori on the basis of tabular values in literature, variable according to the type of material. The volume of the hopper is calculated on the basis of the presumed residence time and the hourly production of material to be treated (imposed by the transformer machine which the hopper must serve). From this it derives that the residence time cannot be considered a variable of the system but is rather a prefixed parameter.

To modify the degree of residual humidity which the granular material presents at the end of the dehumidification treatment, the characteristics of the process air are acted on, modifying the specific airflow, the temperature and/or the dew point temperature.

In such regard it is to be noted that the dew point temperature is defined as the temperature at which, at constant pressure, the air (or more specifically the air-vapor mixture) becomes saturated with water vapor. The dew point temperature is obviously related to the relative humidity of the airflow.

Traditionally the dehumidification process is therefore managed on the basis of standard conditions presented in literature for the different types of material to be treated.

On account of the variability of the conditions in which the dehumidification process takes place inside the hopper (for example related to the thermo-fluid dynamics inside the hopper) dehumidification may not prove entirely satisfactory, with a degree of residual humidity in the treated material over the acceptable maximum limit.

Generally, to overcome this problem the dehumidifying capacity of the process air tends to be prudentially increased compared to the standard conditions envisaged, increasing the specific flow and the temperature and/or decreasing the humidity content of the process air (i.e. lowering the dew point temperature). This obviously has as a consequence a reduction of the energy efficiency of the process.

Solutions of plants have been proposed which envisage regulating the system variables on the basis of the degree of residual humidity detected in the material leaving the hopper, after the dehumidifying treatment, as taught in the US patent application published as no. US2007/0277392.

More in detail, a detection sensor of the humidity of the granular material is positioned at the output mouth of the hopper, so as to regulate in feedback the process variables.

This system however, while improving control of the dehumidification process, is still not entirely satisfactory. The regulation proposed in fact does not have an instantaneous benefit on the quality of the material treated. The material leaving the hopper may therefore not fall within the tolerance limits required.

Moreover, it is widely subject to instability phenomena. It may in fact happen that on account of the variability of the conditions in which the process takes place, due both to the characteristics of the granular material treated and to the thermo-fluid dynamics, the adjustments of the parameters imposed by the system prove opposite to those effectively needed.

SUMMARY OF THE INVENTION

Consequently, the purpose of the present invention is to overcome the drawbacks of the prior art described above, by providing a dehumidification method of material in granular form, which permits residual humidity values of the granular material corresponding to those predefined to be achieved, even in the presence of variable process conditions.

A further purpose of the present invention is to provide a dehumidification method of material in granular form, which permits energy efficiency to be kept high, even in the presence of variable process conditions.

A further purpose of the present invention is to provide a dehumidification plant for granular plastic materials, which permits residual humidity values of the granular material to be achieved corresponding to those predefined, even in the presence of variable process conditions.

A further purpose of the present invention is to provide a dehumidification plant for granular plastic materials which has high energy efficiency under varying operating conditions.

A further purpose of the present invention is to provide a dehumidification plant for granular plastic materials which is simple and economical to make.

BRIEF DESCRIPTION OF THE DRAWINGS

The technical characteristics of the invention, according to the aforesaid purposes, can be seen clearly from the contents of the following claims and the advantages of the same will be more clearly comprehensible from the detailed description below, made with reference to the attached drawings, showing one or more embodiments by way of non-limiting examples, wherein:

DETAILED DESCRIPTION OF THE INVENTION

Figure 1:
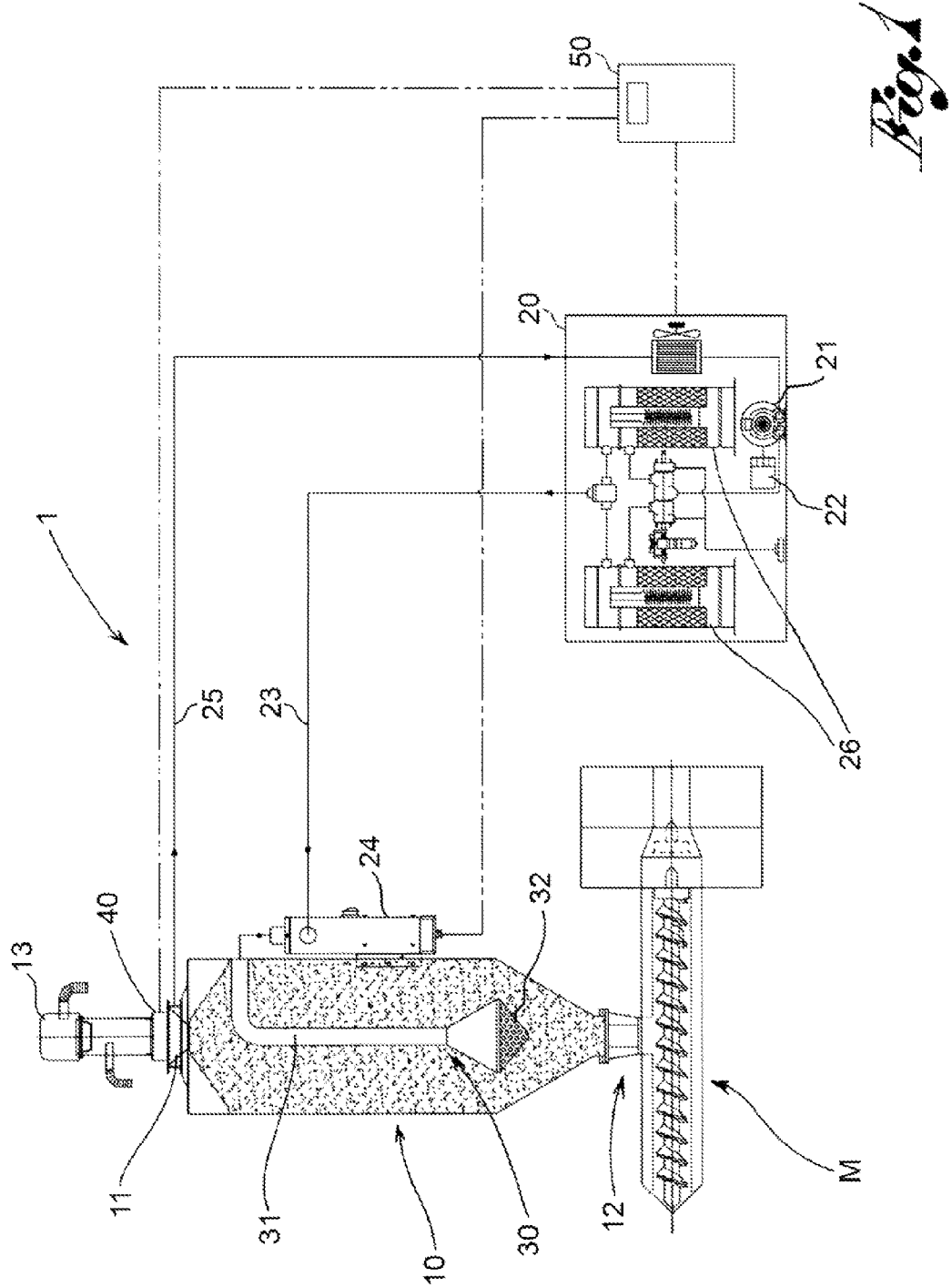
FIG. 1 shows a diagram of a dehumidification plant made according to a first embodiment of the invention.

The present invention relates to both a method and plant for dehumidifying material in granular form, in particular granular plastic materials.

Here and henceforth in the description and the claims the term "granular" is understood to generally include materials in any form, such as in the form of granules, powder or flakes. Thereby also including small flakes, foils or plates produced by the grinding-crushing of plastic material in plate, sheet, or film and the like.

In the description and in the claims reference will be made to a flow of air as process fluid to perform the dehumidification of the granular material. It is understood that such expression process does not refer exclusively to the use of air, but also includes the use of other treatment fluids suitable for the purpose.

The term "hopper" is rather understood to refer to any type of container, not infrequently also called silo, variously shaped in its transverse cross-section, for example with a circular, square or rectangular cross-section, and ending at the bottom with a tapered section provided with a dedicated output mouth, usually controlled by a dedicated output valve.

For the sake of simplicity the plant will be described first and then the dehumidification method according to the invention.

The plant according to the present invention is globally denoted by reference numeral 1 in the appended drawings.

According to a general embodiment of the invention, the dehumidification plant 1 comprises:

at least one hopper 10 for containing the granular material to be dehumidified having a feed mouth 11 and an output mouth 12;

at least one dry air generator 20 fluidically connected to means 30 for distributing the dry air inside the hopper 10.

Advantageously, the plant 1 may be of the multi-hopper type. In such case the regulation of the dry air flow required for each hopper may be regulated by means of a valve positioned on the delivery duct relative to each hopper, as taught in the European patent application published as no. EP 2224196 in the name of the applicant.

Figure 2:
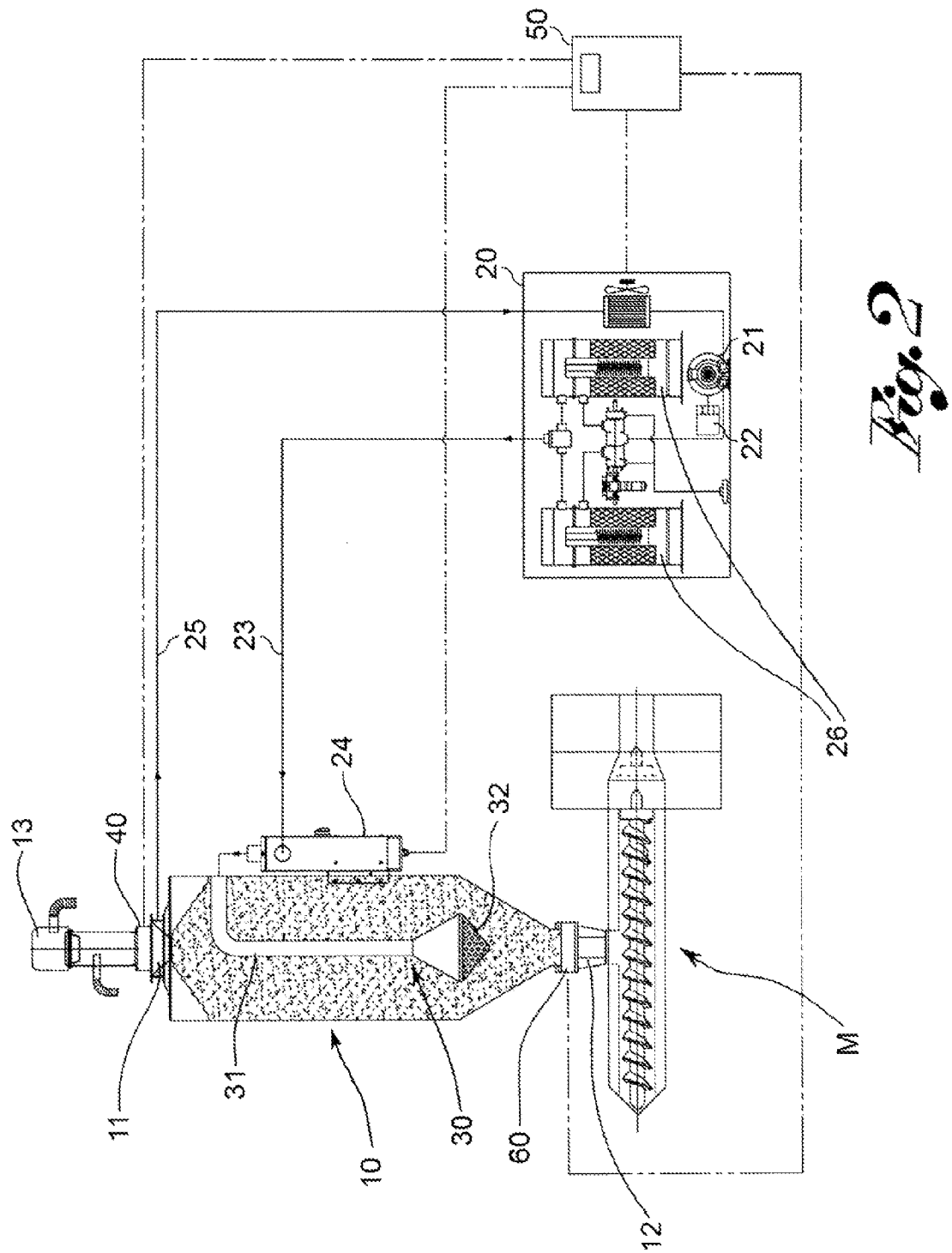
FIG. 2 shows a diagram of a dehumidification plant made according to a second embodiment of the invention.

Preferably, as illustrated in FIGS. 1 and 2, the plant 1 comprises at least one feed (or receiver) device 13 by means of which the granular material is loaded into the hopper 10 up to a predefined level. The feed device 13 is one of the ends of the system for the pneumatic transport (for example in negative pressure) of the granular material, connected to one or more storage silos of the material (not shown).

The dry air generator 20 may be of any type. Preferably, the dry air generator 20 is of the type comprising adsorbent means, such as molecular sieves. The generator may be of the single tower type or of the two or more tower type 26 with adsorbent means (as shown in FIGS. 1 and 2) which alternate with each other in regeneration and operating steps.

The generator is provided with ventilating means 21 (such as a blower) able to generate an air flow though the adsorbent means to send inside the hopper after being dehumidified. The ventilating means (of pressurization or air pumping) consist, for example, of one or more blowers 21, provided with means of varying the speed of rotation 22 of any suitable type, preferably of the electronic type, such as an inverter of any suitable type, which is destined to vary the frequency of the power supply to the motor of the blower 21, so as to be able to modulate the rate of flow of the dry air generated.

The generator 20 is fluidically connected to the hopper 10 by a delivery duct 23 which comes out in a diffuser insert (which constitutes the aforesaid means of distributing the air) placed inside the hopper 10.

More in detail, such diffuser insert 30 may consist of a pipe 31 connected at one end to the delivery duct 23 and which leads at the other end to a diffuser cone 32 positioned in the lower area of the hopper itself. The diffuser has a plurality of holes, through which the (hot) and dry air is fed into the hopper and diffused in a multiplicity of directions so as to strike and thereby dehumidify all the granular material contained inside the hopper. The flow of air is counter current with respect to the flow of granular material coming out of the hopper, to ensure the highest possible degree of dehumidification of the material about to be processed.

Preferably, a heating unit 24 is positioned along the delivery duct 23 to heat the air flow to the desired processing temperature.

Once the air flow has traversed the granular plastic material (from the bottom to the top) and has reached the top of the hopper, the exhausted air (that is to say loaded with the humidity absorbed from the granular material) flows into a return duct 25 to be once again returned to the dry air generator 20.

According to the embodiment of the plant 1 shown in FIGS. 1 and 2, the dry air generator 20 is positioned near the hopper 10 and therefore near the processing machine M which the hopper serves. Such situation may arise, for example, in the case in which an independent dehumidification system with relative dry air generator is provided for each hopper. According to alternative embodiments not shown in the appended drawings it is possible to envisage that the generator 20 be positioned distant from the hopper in a dedicated area.

According to an essential aspect of the invention, the dehumidification plant 1 comprises at least one first measuring device 40 of the humidity of the granular material.

Such first device 40 is positioned at the feed mouth 11 of the hopper 10 to measure the degree of initial humidity of the granular material entering the hopper 10.

As will be described further below, describing the dehumidification method according to the present invention, the present invention is based on the fact that from an operative point of view it is fundamental to consider the degree of initial humidity $c_0$ of the material entering the hopper so as to adequately control and regulate the dehumidification process.

This is in the opposite direction to what has so far been applied in the prior art, where for each type of granular material the degree of initial humidity was considered constant and at most (as in the aforementioned US patent application US2007/0277392) feedback control of the residual degree of humidity $c_f$ of the granular material leaving the hopper was conducted, with all the limitations described.

Experimentally, the applicant has been able to verify that variations in the degree of initial humidity $c_0$ in granular material of the same type are not so infrequent and may lead in the best of cases to excessive energy consumption and in the worst to material leaving the hopper which is not sufficiently dehumidified.

Dehumidification treatment conditions being equal, granular materials with different initial humidity entail different release times of the humidity. If the material to be treated has an initial humidity content higher than standard the aforesaid granular material must be supplied with greater energy, increasing for example the air flow and/or process temperature. Vice versa, if the starting material has initial humidity content lower than standard the energy to be supplied to the system may be reduced, reducing the air flow and/or process temperature, thereby achieving energy savings.

To such purpose, the plant 1 comprises at least one electronic control unit 50 regulating the functioning of the dry air generator 20 on the basis of the initial humidity values of the granular material measured by the aforesaid first device 40 as a function of predefined residual humidity values which the granular material leaving the hopper 10 must have.

Preferably, the aforementioned electronic control unit 50 regulates the functioning of the dry air generator 20 to vary the value of the specific rate of flow of dry air sent to the hopper and/or the temperature of said dry air and/or the humidity content of said dry air according to an energy saving logic.

In particular, the specific rate is varied by acting on the ventilating means 21 by means of the speed variation means 22. The humidity content of the dry air flow (measured with the dew point temperature, tdew) can be regulated by varying as needed the flow of air passing through the adsorbent means, for example by making a part of the air flow by-pass the molecular sieve dehumidification towers. The temperature of the air flow is regulated by acting on the heating unit.

According to a preferred embodiment illustrated in FIG. 2, the plant 1 comprises at least one second measuring device 60 of the humidity of the granular material, Such second device 60 is positioned at the output mouth 12 of the hopper 10 to measure the degree of residual humidity of the granular material leaving the hopper 10.

Operatively, as will be described further below describing the method according to the present invention the aforesaid electronic control unit 50 also regulates the functioning of the dry air generator 20 on the basis of the residual humidity values of the granular material measured by the first device 40.

The two humidity content measuring devices 40, 60 may be based on one or more of the various measuring methods, known in the prior art, such as: microwave resonance, infrared spectrometry or close to infrared, nuclear magnetic resonance analyzers, conductimetric methods, dielectric methods, manometric methods etc.

Preferably, the two measuring devices 40, 60 are of the microwave resonance type.

More specifically, the microwave resonance measuring device may be composed of a open resonator at $\lambda/4$ or $\lambda/2$ with mode propagation which has both the electric field and magnetic field in the plane transverse to the direction of propagation (TEM).

The granular material (before entering the hopper or after leaving the hopper) traverses the resonant chamber or cavity, which in the case of the first device is positioned, for example, between the feed device and the top of the hopper. Such resonant chamber or cavity may have a circular, square or rectangular cross-section or any other shape known to the prior art. More specifically, the device 40, 60 may advantageously be provided with a gate (not shown in the Figures) suitable to close the chamber at the bottom so to permit a sample of material to remain inside it and perform a static type measurement. Hereinafter, the expression "closed chamber" is taken to mean this mode of use of the device.

The conjugation of the electromagnetic field, operating in the frequency interval of microwaves, and the granular material passing through the resonant chamber or cavity determines a resonance frequency f and the factor of merit Q for said resonator, which are related to the humidity value of the material passing through it.

A measurement of the humidity of the granular material in line, before or after dehumidification treatment, performed with a device of the type described above brings considerable benefits, in particular non-invasive measurement of the material to be processed (the electromagnetic radiation has no type of degrading effect on the polymer) and instantaneous measuring times to the order of few seconds.

Advantageously, the two measuring devices 40 and 60 can operate on different measuring intervals. In particular, the first measuring device 40 is set to act on a measuring interval with higher values than the second measuring device 60.

Such choice is particularly useful when processing materials which may start with relatively high humidity levels to then achieve very low levels after dehumidification treatment, as for example in the case of PET. With this type of polymer initial humidity may start from 3000 ppm to reach values of less than 50 ppm after treatment. Consequently the first device, placed at the top of the hopper on the feed mouth, will have a different measurement interval from that positioned on the output mouth.

Advantageously, both the first, and the second device 40 and 60 can be provided with a gate of any suitable type, such as pneumatic, for performance of the measurements in a static manner.

Considering that, in the case of using a microwave resonance device, the humidity of the material is related to the merit factor Q and the resonance frequency, and considering that these values in turn depend on how much material there is inside the resonant chamber or cavity, one can see how the error made when measuring a static material is less than the error made during the transit of the material. Operatively, it is therefore preferable to close the gate positioned under the resonant chamber or cavity, perform the measurement and open the gate to allow the material to flow, so as to be ready for a new measurement.

The dehumidification method according to the present invention will now be described. In the description reference will be made to the dehumidification plant 1 according to the invention just described and the same reference numerals will therefore be used.

According to a general form of implementation of the present invention, the method of dehumidifying material in granular form, in particular plastic materials, comprises the following operating steps:

a) arranging a dehumidification plant 1 comprising at least one hopper 10 for containing the granular material to be dehumidified, having a feed mouth 11 and an output mouth 12, and at least one dry air generator 20 fluidically connected to means 30 for distributing the dry air inside the hopper 10;

b) loading granular material into the hopper through the aforesaid feed mouth 11;

c) measuring the degree of initial humidity C0 of the granular material entering the hopper 10;

d) calculating on the basis of the values of initial humidity C0 of the granular material measured, the dehumidifying capacity of the dry air flow through the hopper needed to achieve predefined residual humidity values in the granular material leaving the hopper, the residence time of the granular material inside the hopper being fixed;

e) generating a dry air flow through said hopper 10 having a dehumidifying capacity calculated in the calculating step d).

It is to be noted that "dry air generator" is understood to comprise in general not only the means of dehumidifying the air (such as the adsorbent towers) and the relative ventilating means (such as the blowers and speed variators), but also the heating means which regulate the temperature of the dry air flow (such as the heating unit 24). It is understood that activation of the dry air generator 20 does not necessarily also impose activation of the heating means 24.

As already mentioned above, contrary to previous applications in the prior art, the present invention is based on the fact that to conduct the dehumidification process of a granular material efficiently and effectively it is essential to consider the effective and real degree of initial humidity c0 of the material entering the hopper.

In other words, it has been verified that it is not sufficient to control just the process variables such as the specific dry air flow rate, temperature and humidity content of the air flow, but it is essential to consider the variability represented by the degree of initial humidity c0 of the material entering the hopper.

If a graph is drawn of the residual humidity value cf of the material in relation to the residence time $\tau$ of the material in the hopper, assuming as constant the aforementioned process variables (specific flow rate k, process temperature T, dew point temperature Tdew), one may see how the curves vary as a function of the initial humidity value c0 of the material.

If the material to be treated has an initial humidity of c01, dehumidifying it at a process temperature of T0, with a specific air flow rate k0 and a dew point temperature of Td0, the material will leave the treatment hopper with a final humidity of cf1 after a residence time $\tau$. Diversely, if the material to be treated has an initial humidity of c02>c01, to achieve the same degree of final residual humidity of Cf01 with the same residence time $\tau$, the specific air flow rate k0 and/or process temperature T0 must be increased and/or the dew point temperature Tdew of the dry air flow must be reduced.

Operatively, during step b) of loading the granular material, step c) of measuring the degree of initial humidity c0 of the granular material is conducted. On the basis of the values found during loading, as a function of the residual humidity value cf to be achieved and the predefined residence time $\tau$ in the hopper the data is elaborated (preferably automatically by means of a control unit 50, CPU) calculating the correct values of the process variables (specific flow rate k, process temperature T and humidity content) and appropriately activating the dry air generator 20 (meaning therefore the ventilating means and if necessary, the heating means).

In particular, on the basis of the initial humidity values c0 measured, the generator 20 will supply dehumidified air at a rate Q depending on hourly production (imposed by the transformer machine M, served by the hopper), according to the following formula: Q=M*k, where k is the specific rate of air flow, which depends as already said on the initial humidity value c0 and on the type of material, by means of a correlation or algorithm. To such purpose the ventilating means 21 will activate as needed, regulating the specific flow rate by means of the speed variation means 22.

Depending on the values of the process variables, the heating means 24 may be activated (if necessary) to heat the flow of air to the desired temperature T, and the control system of the adsorbent means 26 of the generator may be activated to make the flow of air achieve the desired humidity content (measured with the dew point temperature Tdew).

Preferably, the method of dehumidification according to the invention comprises a step f) of regulating the dehumidifying capacity of the air flow by acting on the functioning of the generator 20 upon varying of the initial humidity C0 of the granular material which is progressively loaded in the hopper, on the basis of the initial humidity values of the granular material measured according to an energy-saving logic.

Operatively, the regulation of the dehumidifying capacity is conducted by varying the specific flow rate k and/or the temperature T of the flow and/or the humidity content (defined as Tdew) of the flow.

As mentioned above, the specific flow rate K may be regulated by acting on the ventilating means 21 of the generator 20 by means of the speed variation means 22. The temperature T of the dry air flow can be regulated by the heating means (such as the heating unit 24). The humidity content of the dry air flow can be regulated by varying as needed the flow of air passing through the adsorbent means, for example by making a part of the air flow by-pass the molecular sieve dehumidification towers.

Advantageously, the method according to the present invention may be applied both during functioning in a static regime, that is to say when the hopper is preloaded with the granular material with the transformer machine M not active, and during functioning on a dynamic regime, that is to say when the dehumidified material starts to come out of the output mouth 12 continuing to feed untreated material into the hopper, for example by means of the feed device installed in the feed mouth 11.

It is understood that the method according to the invention may be applied in succession to both types of functioning, or to only one of the two types of functioning.

With dynamic functioning, the method therefore comprises a step I) of emptying from the hopper 10 the granular material subjected to dehumidification through said output mouth 12.

As will be described further below, the regulation step f) is more useful during functioning on a dynamic regime, given that in this functioning mode the residence time $\tau$ in the hopper cannot be modified, unlike during functioning in static mode, when the material is not discharged and therefore intervention on this parameter only is possible (prolonging or shortening the residence of the material in the hopper).

Advantageously, the step c) of measuring the degree of initial humidity c0 of the granular material entering the hopper 10 can be repeated at intervals of time $\Delta t$, preferably not longer than the residence time $\tau$ of the material in the hopper.

According to a particularly preferred form of implementation of the present invention, the dehumidification method comprises a step g) of measuring the degree of residual humidity cf of the granular material leaving the hopper 10. The regulation step f) also is conducted in relation to the values of residual humidity cf of the granular material leaving the hopper measured in the measuring step g).

More particularly, during static functioning, assuming dehumidification has already begun with predefined values of the process variables, the measurement of the degree of residual humidity cf of the granular material is performed on a part of the material near the output mouth 12 (which may already be fully or only partially treated). Once the residual humidity values cf have been acquired, the regulation step f) may take place. Depending on the type of material to be dehumidified, and the initial humidity values c0 measured, the values of the process variables relative to the dry air flow (specific flow rate k, temperature T and humidity content Tdew) may be varied. In this stage the hourly production required during dynamic production may also be taken into consideration, so as to reset the process variables correctly for the subsequent phase (assuming for example that the material which will be fed in subsequently has substantially the same initial humidity values c0.)

Preferably, the step g) of measuring the degree of residual humidity cf of the granular material is performed after a time t subsequent to starting the generator, less than the residence time τ in the hopper (estimated or predefined) of the granular material. On the basis of the residual humidity value cf measured and the residual humidity value to be achieved, feeding of the granular material to the transformer machine below may be activated or not, for example by activating a feeding device (which may consist for example of an screw feeder) positioned under the output mouth.

If the residual humidity value cf of the granular material measured during step g) is less than or the same as the predefined value, feeding of the material to supply processed material is enabled, starting off dynamic functioning. Waiting times for production of the article are thereby reduced and an energy saving of the plant already during static functioning is achieved. If the residual humidity value cf measured during step g) is more than the predefined value, feeding of the material is not enabled and processing is continued, regulating the process variables and/or varying the residence time. The measurement operation corresponding to step g) may be repeated in time.

Advantageously, the small quantity of outgoing granular material which has humidity values not complying with the required specifications may be transported back to the top of the hopper by means of a recycling system (not shown in the appended drawings) for further dehumidification.

Advantageously, in particular with dynamic functioning, the aforesaid step g) of measuring the degree of residual humidity cf of the granular material leaving the hopper 10 is repeated at intervals of time Δt not longer than the residence time τ of the material in the hopper.

Preferably, the method according to the invention comprises a step h) of memorizing the initial c0 and residual Cf humidity values measured in steps c) and g).

The step h) of memorization may be limited to the initial humidity values c0 only, in the case in which control of the residual humidity of the outgoing material is not envisaged.

Advantageously, the initial humidity values c0 can be memorized with the corresponding process parameters defining the dehumidifying capacity of the air flow.

In the regulating step f), the residual humidity values cf are considered in relation to the initial humidity values c0 measured at an earlier interval of time corresponding to the residence time τ of the material in the hopper.

In particular, in the regulating step f) the dehumidifying capacity is regulated considering the initial humidity values c0 measured progressively over time as values weighted on the quantity of granular material which entered the hopper and is temporarily correlatable to each of them. This way regulating of the process variables may be progressively and continuously adapted to the effective requirements of the material in the hopper, considered as an average of various inputs (understood as materials with different initial humidity contents).

Preferably, as already mentioned describing the plant according to the present invention step c) of measuring the initial humidity c0 is conducted by means of at least one first humidity measuring device 40 of the microwave resonance type, positioned at the feed mouth 11 of the hopper 10.

In the same way, step g) of measuring the residual humidity cf is conducted by means of at least one second humidity measuring device 60 of the microwave resonance type, positioned at the output mouth 12 of the hopper 10.

The humidity measuring device 40, 60 of the microwave resonance type comprises at least one resonant chamber. Preferably, measurement is performed with the chamber closed, so as to reduce error, as already explained above.

Figure 3:
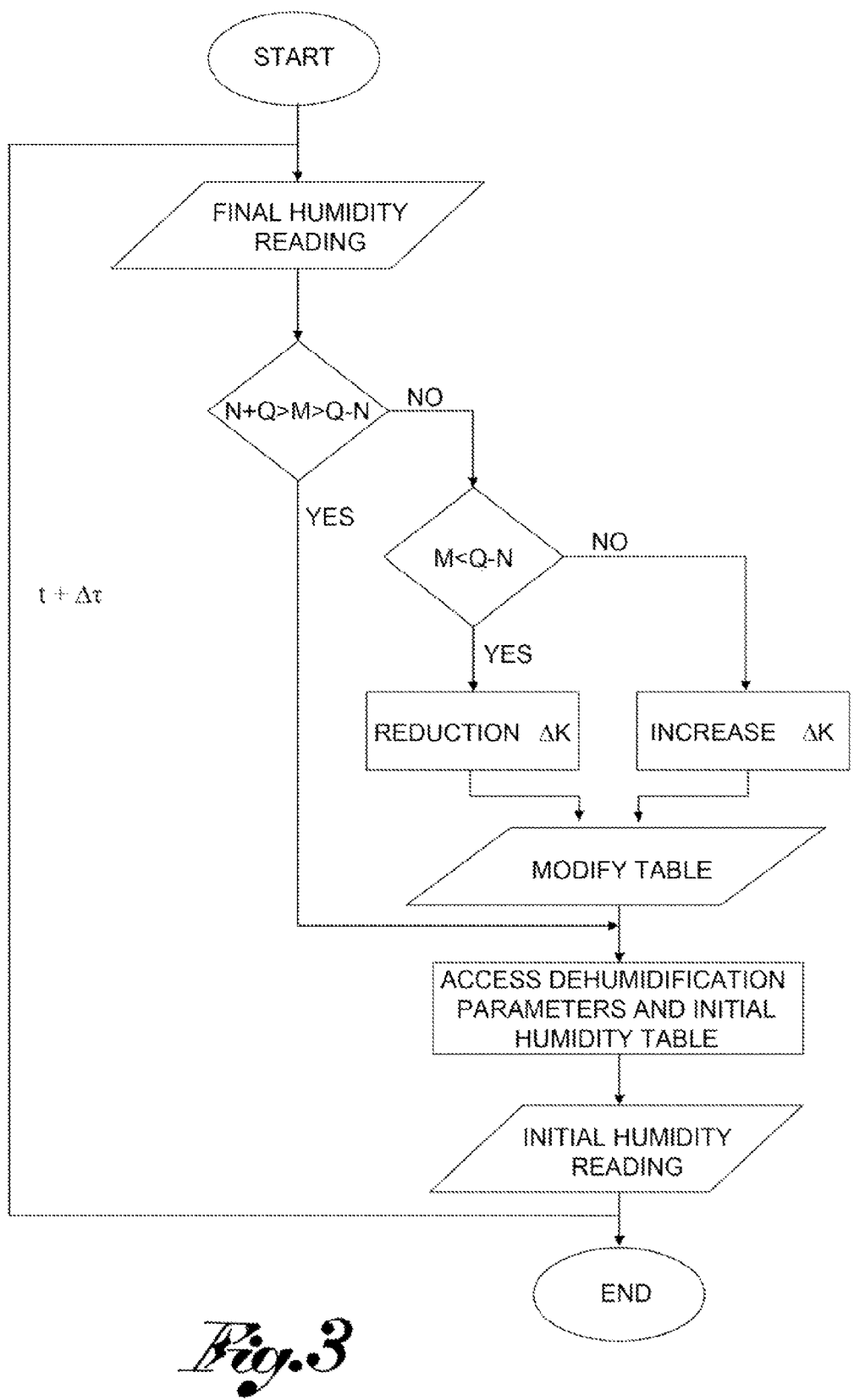
FIG. 3 shows a flow diagram of the control logic used in the dehumidification method according to a preferred application of the invention.

A preferred control logic will now be described applied in particular to dynamic functioning with reference to the flow diagram shown in FIG. 3.

The diagram should be read assuming that the system already avails of a set of imposed values for the process variables, for example deriving from a previous phase of static functioning or simply from a previous phase with dynamic functioning.

More specifically, at the first I/O block the second measuring device positioned under the output mouth will measure the residual humidity content cf of the material leaving the hopper. The next control block will then verify whether the residual humidity values are within an interval [Q−N, Q+N], where the value Q is the residual humidity value of the material required to proceed with the transformation of the granular material into the final product and N is a predefined tolerance value.

If the values cf are not within the aforesaid interval the next control block will verify if the aforesaid measured values cf are below the threshold Q−N (i.e. material drier than needed). If such condition is verified the next processing block reduces the dehumidifying capacity of the air flow (for example by reducing the specific air flow rate by a certain value Δk, and/or the temperature T and/or the humidity content i.e. Tdew).

Vice versa, if the previous condition (cf<Q−N) is not met and the value of cf is therefore over the threshold Q+N (i.e. the material is more humid than required) the dehumidifying capacity of the air flow is increased.

From the dehumidifying capacity variation block (variations of the specific rate and/or process temperature and/or dew point temperature of the air flow) the next I/O block modifies the database of process parameters.

More particularly, the table of parameters of the process variables, such as the specific air flow rate and/or process temperature and/or dew point temperature is modified as a function of the initial humidity values before treatment measured earlier, for example in the time t-τ (where τ is the residence time of the material in the hopper) with the first humidity content measuring device placed at the top of the hopper.

The next block is access to the database containing the new dehumidification parameters modified on the basis of the initial humidity values by the variation of the aforesaid variables of the gaseous fluid.

The last I/O block before the end (dehumidification system off) is measurement of the initial humidity.

At the time t+Δτ it starts again from the beginning with the reading of the final residual humidity of the granular material; the time Δτ may correspond to the residence time τ or to a lower value.

As already mentioned for a reliable correspondence of the dehumidification parameter and the initial humidity one must wait for the time needed for the material to traverse the two measuring devices of the humidity content, corresponding to the residence time.

One may note that using two measuring devices 40, 60, one at the feed mouth 11 and one at the output mouth 12 of the hopper and applying the control logic described above with reference to FIG. 3, one can keep track of all the process variables, especially of the initial humidity of the material to be subjected to dehumidification.

Moreover, thanks to the two measuring devices 40, 60 and the control logic the system is able to learn autonomously.

It may be observed in fact that certain types of granules, even if relative to the same polymer, may differ for example in granule size. As a result the specific air flow rate and/or process temperature and/or dew point temperature values defined as a function of initial humidity to achieve a predefined residual humidity value after treatment may not be correct.

Thanks to the method according to the invention the correct values of the process variables as a function of initial humidity can be found without performing preliminary tests. The system is therefore able to self-learn.

The invention makes it possible to achieve numerous advantages some of which already described.

Compared to the traditional solutions of the art, the dehumidification method and plant according to the invention permit residual humidity values of the granular material corresponding to predefined values to be achieved, even in the presence of variable process conditions, in particular due to variability in the characteristics of the material loaded into the hopper.

The dehumidification method and plant according to the invention make it possible to significantly reduce the energy consumption of dehumidification treatment, adapting the process variables to the effective requirements of the material to be treated.

In particular, the dehumidification method and plant according to the invention permit energy efficiency to be kept high, even in the presence of variable process conditions.

The dehumidification method according to the invention makes it possible to implement a regulation system which has immediate benefits on the quality of the material treated.

The regulation system which can be implemented with the dehumidification method according to the invention is less likely to be subject to phenomena of instability.

The dehumidification method according to the invention also makes it possible to implement a regulation system with self-learning abilities.

The dehumidification plant according to the invention is lastly simple and economical to produce, given that it does not require special plant modifications.

The invention thus conceived thereby achieves the intended objectives.

Obviously, it may assume, in its practical embodiments, forms and configurations different from those illustrated above while remaining within the present sphere of protection.

Furthermore, all the parts may be replaced with technically equivalent parts and the dimensions, shapes and materials used may be varied as required.

The invention claimed is:

1. Method for dehumidifying plastic material in granular form, comprising the following operating steps:
    a) arranging a dehumidification plant comprising at least one hopper for containing the granular material to be dehumidified, which has a feed mouth and an output mouth, and at least one dry air generator, fluidically connected to means for distributing a flow of dry air inside said hopper;
    b) loading granular material into said hopper through said feed mouth;
    c) measuring the degree of initial humidity of the granular material entering the hopper;
    d) calculating, on the basis of the values of initial humidity of the granular material measured, the dehumidifying capacity of the dry air flow through the hopper needed to achieve predefined humidity values in the granular material leaving the hopper, the residence time of the granular material inside the hopper being fixed;
    e) generating a flow of dry air through said hopper having a dehumidifying capacity calculated in the calculating step d).

2. Method of dehumidification according to claim 1, further comprising
    f) regulating the dehumidifying capacity of said flow by acting on the functioning of said generator upon varying of the initial humidity of the granular material which is progressively loaded in the hopper, on the basis of the initial humidity values of the granular material measured, according to an energy-saving logic.

3. Method of dehumidification according to claim 2, wherein the regulation of the dehumidifying capacity is conducted by varying the specific rate of said flow and/or the temperature of said flow and/or the humidity content of said flow.

4. Method of dehumidification according to claim 2, further comprising
    g) measuring the degree of residual humidity of the granular material leaving the hopper, said regulating step f) being conducted also in relation to the values of residual humidity of the granular material leaving the hopper measured in the measuring step g).

5. Method of dehumidification according to claim 4, wherein said step g) of measuring the degree of residual humidity of the granular material leaving the hopper is repeated at intervals of time not longer than the residence time of the material in the hopper.

6. Method of dehumidification according to claim 4, further comprising
    h) memorizing the initial and residual humidity values respectively measured in steps c) and g).

7. Method of dehumidification according to claim 6, wherein in said regulation step f) the residual humidity values are considered in correlation to the initial humidity values measured at an earlier interval of time corresponding to the residence time of the material in the hopper.

8. Method of dehumidification according to one claim 1, wherein said step c) of measuring the degree of initial humidity of the granular material entering the hopper is repeated at intervals of time not longer than the residence time of the material in the hopper.

9. Method of dehumidification according to claim 2, wherein in said regulation step f) the dehumidifying capacity is regulated considering the initial humidity values measured progressively over time as values weighted on the quantity of material which is entered the hopper and is temporarily correlatable to each of them.

10. Method of dehumidification according to claim 1, wherein said step c) of measuring the initial humidity is conducted by means of at least a first device for measuring humidity of the microwave resonance type, positioned at the feed mouth of the hopper.

11. Method of dehumidification according to claim 4, wherein said step g) of measuring the residual humidity is conducted by means of at least a second device for measuring humidity of the microwave resonance type, positioned at the output mouth of the hopper.

12. Method of dehumidification according to claim 10, wherein said first humidity measuring device of the microwave resonance type comprises at least one resonant chamber, the measurement being performed with said chamber closed.

13. Method of dehumidification according to claim 11, wherein said second humidity measuring device of the microwave resonance type comprises at least one resonant chamber, the measurement being performed with said chamber closed.

14. Method of dehumidification according to claim 1, further comprising
   i) discharging from the hopper the granular material subjected to dehumidification through said output mouth.

15. Dehumidification plant of plastic material in granular form, comprising:
   at least one hopper for containing the granular material to be dehumidified having a feed mouth and an output mouth;
   at least one dry air generator fluidically connected to means for distributing the dry air inside said hopper,
characterized by the fact of comprising at least a first measuring device of the humidity in the granular material, such first device being positioned at the feed mouth of the hopper to measure the degree of initial humidity of the granular material entering the hopper, and characterized by the fact of comprising at least one electronic control unit which regulates the functioning of the dry air generator on the basis of the initial humidity values of the granular material measured by said first device in function of predefined residual humidity values which the granular material leaving the hopper must have.

16. Dehumidification plant according to claim 15, where said electronic control unit regulates the functioning of the dry air generator to vary the value of the specific rate of flow of dry air sent to the hopper and/or the temperature of said dry air and/or the humidity content of said dry air according to an energy saving logic.

17. Dehumidification plant according to claim 15, comprising at least a second measuring device of the humidity in the granular material, such second device being positioned at the output mouth of the hopper to measure the degree of residual humidity of the granular material leaving the hopper, said electronic control unit regulating the functioning of the dry air generator also on the basis of the residual humidity values of the granular material measured by said first device.

18. Dehumidification plant according to claim 17, wherein said first and second measuring device are of the microwave resonance type.

19. Dehumidification plant according to claim 18, wherein said first measuring device is set to work on a measuring interval with higher values than the second measuring device.

* * * * *